US012523482B2

(12) United States Patent
Pham

(10) Patent No.: US 12,523,482 B2
(45) Date of Patent: Jan. 13, 2026

(54) KNOWLEDGE-BASED ARTIFICIAL INTELLIGENCE SYSTEM FOR ESTIMATING VEHICLE RANGE

(71) Applicant: Toyota Motor Engineering & Manufacturing North America, Inc., Plano, TX (US)

(72) Inventor: Alexander Tuan Pham, San Jose, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

(*) Notice: Subject to any disclaimer, the term of this patent is extended or adjusted under 35 U.S.C. 154(b) by 79 days.

(21) Appl. No.: 18/443,111

(22) Filed: Feb. 15, 2024

(65) Prior Publication Data
US 2025/0264337 A1    Aug. 21, 2025

(51) Int. Cl.
G01C 21/34    (2006.01)

(52) U.S. Cl.
CPC ..... *G01C 21/3469* (2013.01); *G01C 21/3446* (2013.01)

(58) Field of Classification Search
CPC ...... G01C 21/005; G01C 21/26; G01C 21/34; G01C 21/3446; G01C 21/3469; G01C 21/3476; G01C 21/3697; B60W 20/00; B60W 20/11; B60L 15/2045; B60L 2240/70; B60L 2260/52; Y02T 10/64; Y02T 10/70; Y02T 10/7072; Y02T 10/72; Y02T 90/12; Y02T 90/16

USPC .......................................... 701/188, 120–123
See application file for complete search history.

(56) References Cited

U.S. PATENT DOCUMENTS

| | | | |
|---|---|---|---|
| 6,487,477 B1 | 11/2002 | Woestman et al. | |
| 8,229,611 B2 | 7/2012 | Yamada | |
| 8,543,287 B2 | 9/2013 | Stevens et al. | |
| 8,670,885 B2 | 3/2014 | Gilman et al. | |
| 9,103,686 B2 | 8/2015 | Pettersson | |
| 10,430,883 B1* | 10/2019 | Bischoff | G06Q 40/04 |
| 10,464,547 B2 | 11/2019 | Park et al. | |
| 10,612,933 B1* | 4/2020 | Ledet | G01C 21/3469 |
| 10,809,733 B2 | 10/2020 | Lindemann et al. | |
| 11,709,064 B2* | 7/2023 | Cha | B60L 58/12 |
| | | | 701/123 |

(Continued)

FOREIGN PATENT DOCUMENTS

| | | |
|---|---|---|
| CN | 115424232 B | 2/2023 |
| EP | 4186737 A1 | 5/2023 |

OTHER PUBLICATIONS

Website, Knowledge-Based System (KBS), https://www.autoblocks.ai/glossary/knowledge-based-system, retrieved Feb. 2024, 3 pages.

*Primary Examiner* — Logan M Kraft
*Assistant Examiner* — Johnny H Hoang
(74) *Attorney, Agent, or Firm* — Jordan IP Law, LLC

(57) ABSTRACT

Apparatuses, systems, and methods relate to technology to identify travel data associated with a vehicle. The technology further identifies a travel route associated with the vehicle based on the travel data, identifies a selected rule from a plurality of rules based on one or more of a first characteristic of the travel route or a second characteristic of the vehicle, and determines a depletion mileage amount for the vehicle based on the selected rule.

17 Claims, 10 Drawing Sheets

(56) References Cited

U.S. PATENT DOCUMENTS

| | | | |
|---|---|---|---|
| 12,151,586 B2* | 11/2024 | Naito | H02J 7/0048 |
| 2010/0090818 A1* | 4/2010 | Sekiyama | G01F 9/02 |
| | | | 340/439 |
| 2011/0225105 A1 | 9/2011 | Scholer et al. | |
| 2011/0270486 A1 | 11/2011 | Stevens et al. | |
| 2013/0096818 A1 | 4/2013 | Vicharelli et al. | |
| 2013/0218724 A1 | 8/2013 | Moretti et al. | |
| 2018/0143029 A1 | 5/2018 | Nikulin et al. | |
| 2019/0061779 A1* | 2/2019 | Mohan | B60K 35/215 |
| 2019/0162546 A1* | 5/2019 | Duale | G01C 21/3438 |
| 2020/0011687 A1 | 1/2020 | Lindemann et al. | |
| 2020/0286199 A1* | 9/2020 | Maddipati | G06F 16/29 |
| 2020/0334637 A1* | 10/2020 | Turner | G06Q 10/08355 |
| 2022/0019233 A1 | 1/2022 | Parenti et al. | |
| 2022/0373352 A1* | 11/2022 | Turner | G01C 21/3461 |
| 2023/0117358 A1 | 4/2023 | Bruneau | |

\* cited by examiner

KNOWLEDGE-BASED ARTIFICIAL INTELLIGENCE SYSTEM FOR ESTIMATING VEHICLE RANGE

TECHNICAL FIELD

Examples generally relate to mileage range predictions. In detail, examples relate to predicting mileage range predictions of vehicles with a knowledge-based artificial intelligence system (KBAIS).

BACKGROUND

Vehicles may travel along routes to different locations. For example, a vehicle may travel along a route from an origin to a destination. In order to do so, energy may be consumed by the vehicles to operate and travel along route. The energy may take various forms, including gasoline, electric, etc.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In some aspects, the techniques described herein relate to a computing system including at least one processor, and at least one memory having instructions, which when executed by the at least one processor, causes the computing system to identify travel data associated with a vehicle, identify a travel route associated with the vehicle based on the travel data, identify a selected rule from a plurality of rules based on one or more of a first characteristic of the travel route or a second characteristic of the vehicle, and determine a depletion mileage amount for the vehicle based on the selected rule.

In some aspects, the techniques described herein relate to at least one computer readable storage medium including a set of instructions, which when executed by a computing device, cause the computing device to identify travel data associated with a vehicle, identify a travel route associated with the vehicle based on the travel data, identify a selected rule from a plurality of rules based on one or more of a first characteristic of the travel route or a second characteristic of the vehicle, and determine a depletion mileage amount for the vehicle based on the selected rule.

In some aspects, the techniques described herein relate to a method including identifying travel data associated with a vehicle, identifying a travel route associated with the vehicle based on the travel data, identifying a selected rule from a plurality of rules based on one or more of a first characteristic of the travel route or a second characteristic of the vehicle, and determining a depletion mileage amount for the vehicle based on the selected rule.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
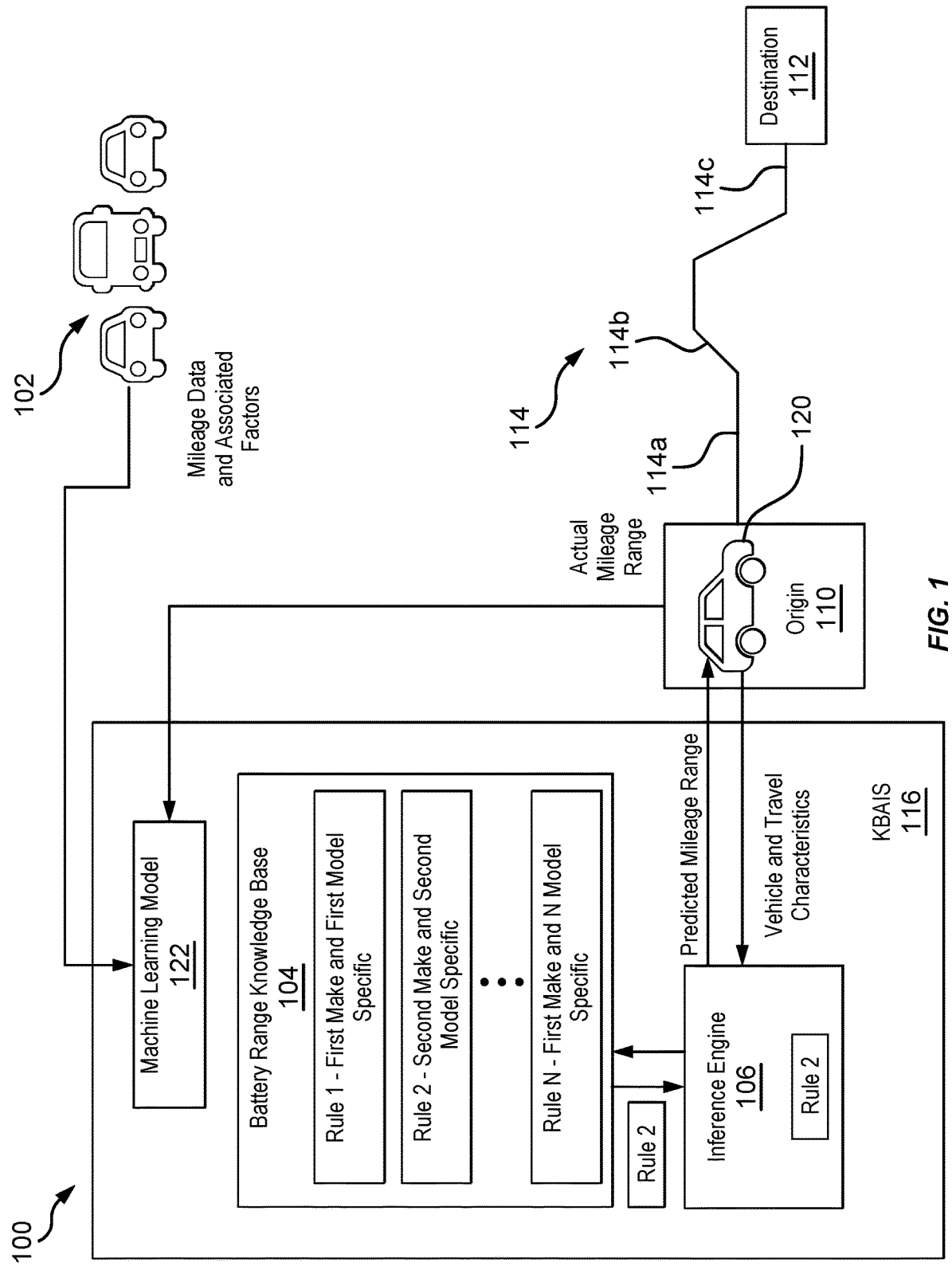
FIG. 1 illustrates a diagram of a mileage range prediction process in accordance with an example.

Existing examples fail to accurately predict a mileage range of a vehicle, particularly in the case of an electric vehicle that operates based on electrical energy from batteries. Some existing examples may determine the range based on a best-case scenario of travel, which is often times inaccurate and omits considering real-world driving conditions. For example, some existing examples calculate predicted mileage range of a vehicle to be the amount of miles (e.g., 340 miles) that the vehicle may travel under the best case scenario (e.g., flat terrain, no traffic, straight, etc.). The vehicle may not travel under the best-case scenario as many travel routes have curves, traffic, altitude changes, various climates etc. Such existing implementations fail to adjust the predicted mileage range (e.g., how many miles the vehicle may travel) based on the travel route.

Some existing examples may accumulate fleet data about the battery range of vehicles traveling on certain roads. Such existing examples rely on probabilistic prediction models which are often inaccurate and fail to account for a multitude of factors that affect mileage range. For example, artificial intelligence (AI) modelling (e.g., probabilistic prediction modelling) computation may be exceedingly expensive. Moreover, such AI models may not consider some factors (e.g., the factors are not collected and are not available), and may be unable to provide an accurate output based on the numerous factors that may impact mileage. Thus, developing an accurate range estimation via an AI model may be difficult if not impossible, and computationally expensive.

Some other existing examples may generate an energy usage prediction plan for a vehicle along a planned route based on a variety of factors. Such energy usage prediction plans are often inaccurate and do not correspond to mileage range. For example, such energy usage prediction plans may be generalized, fail to provide an accurate indication of mileage ranges and fail to account for specific distinctions that may exist among different vehicles and drivers, causing inaccurate mileage ranges. Thus, existing examples fail to accurately predict mileage ranges for vehicle travel.

Such a failure to provide accurate mileage ranges affects vehicle travel. For example, a vehicle may travel a certain distance prior to refueling and/or recharging. If the predicted mileage range for a vehicle is inaccurate, the vehicle may run out of energy and/or fuel prior to reaching a refilling station and/or recharging station. In such examples, the vehicle may be stranded on a roadway until assistance arrives. Such situations may cause not only stress, delay and discomfort to the driver of the vehicle and the occupants of the vehicle, but may be dangerous as well. For example, stranded motorists may be at increased rates of injury, fatality and other risk factors.

Furthermore, a travel route may be generated based in part on the predicted mileage range. If the predicted mileage range is inaccurate, the travel route may be substandard and forgo/bypass recharging and/or refilling stations along the travel route. Thus, computer systems that rely on the predicted mileage range may also be affected and result in sub-optimal performance with the predicted mileage range is inaccurate.

Enhanced examples as described herein remedy the sub-standard performance of the abovementioned existing examples. That is, enhanced examples increase the accuracy of mileage range estimates and/or predictions by adjusting the predicted mileage range based on specific characteristics of the travel route and vehicle. For example, two different travel routes may have the same mileage, and impact the predicted mileage range differently depending on characteristics (e.g., terrain) of the two different travel routes. Examples may consider the characteristics to generate more accurate predicted mileage ranges.

Examples train a model using knowledge-based learning that is rule-based to predict the mileage range. For example, a KBAIS includes a rules-based system. The rules-based system generates pre-defined outputs based on certain rules programmed by a machine learning model. That is, rules-based AI systems (e.g., KBAIS) exhibit "fixed intelligence", and follow a defined series of rules and instructions. Rule-based AI systems produce pre-set outputs. In order to accomplish the enhancements as described herein, examples may identify travel data associated with a vehicle, identify a travel route associated with the vehicle based on the travel data, and determine, with a KBAIS, a predicted mileage range (e.g., how many miles the vehicle may travel before the battery of the vehicle is exhausted and the vehicle no longer has sufficient charge to power movement) for the vehicle based on the travel route. In detail, examples may identify a selected rule from a plurality of rules based on one or more of a first characteristic of the travel route or a second characteristic of the vehicle and determine a depletion mileage amount for the vehicle based on the selected rule. The depletion mileage amount may mean how many miles may be deducted from a total mileage range of the vehicle to generate the predicted mileage range.

Some other machine learning models (e.g., probabilistic models such as Logistic Regression, Bayesian Classifiers, Hidden Markov Models, and Neural Networks), adjust the machine learning model based on a learning algorithm (e.g., without human intervention) and trains based on an output and training data. For example, rather than definite outputs, machine learning models "adjust" and "evolve" based on continuous streams of training data during training. Machine learning models may therefore automatically learn from human experiences and improve performance based on the data fed into the machine learning models. Such probabilistic machine learning models may be far more costly (e.g., consume more memory, processing power, resources, bandwidth, etc.) than KBAIS and be more difficult to retrain and/or adjust. Thus, the KBAIS is more lightweight, efficient, flexible to new situations, adaptable and lower latency than probabilistic machine learning models and provides specific enhancements to computing architectures, in particular vehicle architectures and technology.

Turning now to FIG. 1, a mileage range prediction process 100 is illustrated. The mileage range prediction process 100 may harvest mileage data and associated factors from a fleet of vehicles 102. The associated factors may include different factors that impact mileage range of a vehicle. For example, each vehicle may have mileage data (e.g., how certain routes impact mileage range of the vehicle) associated factors that include a model of a vehicle, a make of the vehicle, an age of the vehicle, a software feature of the vehicle, a driver profile associated with a driver of the vehicle, a terrain of a route that the vehicle travels upon, a weight of the vehicle, a number of passengers of the vehicle, comfort settings of the vehicle, a charging setting of the vehicle or sensor data of the vehicle.

For example, the make and model of a vehicle may affect mileage. That is, different makes and models of vehicles have different battery capacities and energy efficiencies. Thus, the make and model may be considered when determining predicted mileage ranges. Mileage range data from similar makes and models may be clustered together to generate average predicted mileage ranges.

Similarly, the age of the vehicle may also be considered. For example, an older vehicle may be less efficient than newer vehicles due to technological differences, age degradation (e.g., battery degradation) and so forth. Thus, the age of the vehicle may be considered. In some examples, the battery age of the vehicle may be considered independently of the vehicle age since the battery of the vehicle may be periodically replaced.

Further, the software feature of the vehicle consume energy and may affect mileage. For example, some vehicles include autonomous driving features (e.g., self-driving vehicle that operates with minimal or no human intervention), artificial intelligence (AI), navigation features, streaming features and other computer intensive programs. Thus, the software features of the vehicle may be considered, and in particular whether the software features are enabled (e.g., being utilized), and a measure of power consumption of the software features.

Further, a driver profile associated with a driver of the vehicle may affect the mileage. For example, energy consumption of a vehicle may be affected based on characteristics of a driver. For example, energy usage will be increased if a driver accelerates rapidly, decelerates rapidly and/or travels at rapid velocities relative to a driver that accelerates slowly, decelerates slowly and/or travels at lower velocities. Thus, the driver profile may be considered.

Furthermore, a terrain of a route of the vehicle affect the mileage. That is, different routes may consume different amount of energies, even if the mileage is the same. For example, routes with altitude changes, Pavement Vehicle Interaction (PVI) factors (e.g., roughness of road, texture of road, and deflection of road), curvature of roadway, etc. may affect mileage ranges (e.g., more energy is consumed when travelling uphill relative to downhill, and more energy is consumed when travelling along a rough roadway relative to a smooth roadway). The roughness describes a smoothness or bumpiness of road. The abrasiveness of the road surface represents vehicle traction when surface conditions are wet. Deflection represents the bending of pavement under the weight of a vehicle. The PVI factors may also affect mileage ranges and may be considered.

Moreover, a weight of the vehicle and/or a number of passengers of the vehicle may be considered. For example, heavier vehicles will consume more energy to operate and move. That is, a weight of the vehicle affects energy consumption. In some examples, the number of occupants may be identified and the weight may be estimated based on the number of occupants. For example, each occupant may be weighted by a weighting factor (e.g., around 181 pounds, or the weight of an average U.S. adult), and the total weight may be calculated based on the weight factor and the number of occupants.

In some examples, the comfort settings of the vehicle may also be considered. For example, operating certain vehicle features (e.g., air-conditioning, heated seats, etc.) consumes energy and affects mileage range. Thus, the comfort settings of the vehicle may also be considered.

A charging setting of the vehicle may also be considered. For example, a vehicle battery that is rapidly charged may discharge more rapidly than a vehicle battery that is charged slowly. Thus, a charging time and type of charger (e.g., rapid, fast or high-powered charger) that charged the vehicle is considered. In some examples, a kilowatt (KW) capacity of the charger that last charged the vehicle is considered (e.g., 7 kW, 25 kW, etc.).

Sensor data may also be considered. For example, sensor data may indicate that a tire condition, such as the tire pressure of a vehicle is low and include imaging data that indicates high traffic with poor weather conditions (e.g., raining, sleeting, etc.). Such low tire pressure, high traffic and poor weather may also affect the mileage range (e.g., reduces efficiency of the vehicle and lowers the mileage range) of the vehicle. As such the sensor data may be considered.

A KBAIS 116 may include a representation of the different mileage data and associated factors. The KBAIS 116 may combine data-drive methods (e.g., mechanism agnostic) and physics-based models (e.g., knowledge about chemical/physical processes). Thus, the KBAIS 116 may include an approach that includes a hybrid model combining advantages from both the data-driven methods and the physics-based models.

For example, the KBAIS 116 may include a battery range knowledge base 104. The battery range knowledge base 104 may include a series of rules (e.g., physics-based equations that are selectively applied) comprising rule 1-rule N. An operator may manually program the battery range knowledge base 104 based on the mileage data and the associated factors.

In some examples, a machine learning model 122 (e.g., neural network, deep learning model, etc.) may generate the rules 1-rule N. For example, the machine learning model 122 may be trained to output physics-based equations based on various inputs. For example, the machine learning model 122 may receive (e.g., as an input) various driving characteristics and travel route characteristics, and output a physics-based equation. The machine learning model 122 may be retrained based on how accurate the physics-based equation models real-world mileage behavior. In some examples, an operator may generate second physics-based equations, that serve as ground truths to train the machine learning model 122. For example, the machine learning model 122 may generate first physics-based equations to model mileage behavior. The machine learning model 122 may compare the first physics-based equations to second physics-based equations that model the mileage behavior, and execute back propagation based on the differences between the first and second physics-based equations.

Table I illustrates various types of data for a vehicle travelling along flat terrain that may be provided to the machine learning model 122 during inference and/or training.

TABLE I

| Types of Vehicles | Terrain | Distance | Odometer Start | Odometer Stop | Variance of Miles and Distance | Weight of Vehicles | Wind | Outside Temperature | and other factors |
|---|---|---|---|---|---|---|---|---|---|
| Model 1 | Flat | 10 | 30 | 45 | 5 | | | | |
| Model 1 | Flat | 20 | 50 | 80 | 10 | | | | |

Based on Table I, the machine learning model 122 may generate a knowledge rule that represents for every 10 miles to deduct 5 miles from an odometer reading.

Table II illustrates various types of data for a vehicle traveling on uphill terrain that may be provided to the machine learning model 122 during inference and/or training.

TABLE II

| Types of Vehicles | Terrain | Distance | Odometer Start | Odometer Stop | Variance of Miles and Distance | Weight of Vehicles | Wind | Outside Temperature | and other factors |
|---|---|---|---|---|---|---|---|---|---|
| Model 1 | 1000 | 10 | 30 | 55 | 15 | | | | |
| Model 1 | 1000 | 20 | 50 | 100 | 30 | | | | |

A simple knowledge rule may be extracted for uphill terrain that for about 1000 foot incline for every 10 miles, deduct 15 miles from an odometer. The odometer reading may be inaccurate during travel, because the odometer reading is affected by many other factors like temperature, system-on-chip, navigation, etc. These factors are accurately reflected in the rules noted above.

Thus, examples may observe and create new physical formula, (e.g., several hundred rules apply to generally). Examples generalize these rules through actual data and observation and then code them into the KBAIS 116, and in particular the battery range knowledge base 104. Doing so is quicker and offers better accuracy than training complex AI systems where the result might be unexplainable and difficult to adjust. For example, Equations 1 and 2 are provided below and may be different rules:

$$\text{Range Estimate} = W * (\text{If } T = 1) * (D + 5) \quad \text{Equation 1}$$

$$\text{Range Estimate} = W * (\text{If } T = 1000) * (D + 15) \quad \text{Equation 2}$$

In Equations 1 and 2, the type of cars (weight) is W, and the terrain of a route of the vehicle is T.

The KBAIS 116 may further include an inference engine 106. The inference engine 106 may access the battery range knowledge base 104 to make deductions and reach a conclusion, which in this example is the depletion mileage amount which in turn is subtracted from a total mileage range of the vehicle 120 to generate a predicted mileage range. Equation 3 below represents the predicted mileage range:

$$\text{Predicted mileage range} = \quad \text{Equation 3}$$
$$\text{total range of vehicle} - \text{depletion mileage amount}$$

The inference engine 106 may receive navigation data from a vehicle 120. The navigation data may include a travel route associated with the vehicle 120. For example, the inference engine 106 may select relevant rules from rules 1-N, and apply the relevant rules based on the navigation data.

In some examples, the inference engine 106 may also receive specific data (e.g., second or fourth characteristics) indicating one or more of a model of the vehicle 120, a temperature of the vehicle 120, a temperature of an environment of the vehicle 120, a make of the vehicle 120, an age of the vehicle 120, an age, current charge and/or temperature of a battery of the vehicle 120, a weight of the vehicle 120, a load of the vehicle 120, a comfort setting of the vehicle 120, a software feature of the vehicle 120, a charging setting of the vehicle 120, a state of charge (e.g., charging or discharging) of the battery, sensor data of the vehicle 120, a condition of a tire of the vehicle 120 (e.g., tire pressure, age, etc.), heating, ventilation, and air conditioning (HVAC) of vehicle 120, humidity and pressure of the environment of the vehicle 120, or a driver profile (e.g., driver habits) associated with a driver of the vehicle 120. The inference engine 106 may identify and execute rules from the rule 1-rule N based on the specific data, and form a deduction and/or conclusion accordingly.

In some examples, the KBAIS 116 may determine the driver profile. For example, driving metrics (e.g., average acceleration of the driver, average deceleration of the driver, average speed of the driver, whether the driver switches lanes frequently, etc.) of the driver may be determined (e.g., track driving habits of the driver over a period of time), and categorized into a category (e.g., rapid driver, slow driver, etc.). The machine learning model 122 may generate rules specific to the category. For example, a slower driver may have lower energy consumption, and thus one rule of the battery range knowledge base 104 may be applicable to the slower driver category (e.g., increase depletion mileage amount based on actual number of miles travelled, terrain and altitude as well as other factors but not based on driver speed). A faster driver may be categorized into a fast driver category (e.g., faster drivers have higher rates of energy consumption) and another rule may be applicable to faster drivers (e.g., increase depletion mileage amount based on actual number of miles travelled, terrain and altitude as well as other factors, and further increase depletion mileage amount by 5 miles for every 20 miles travelled due to faster driving speed). The inference engine 106 may select the appropriate rule based on the driver profile, for example by categorizing a driver of the vehicle 120 into a fast driver category and select the rule from the battery range knowledge base 104 for the fast driver category. Thus, the inference engine 106 may then process the rules based on the category to determine a deduction and/or conclusion.

In some examples, the model and make of the vehicle 120 may be considered. The inference engine 106 may apply and execute rules from the rules 1-N specific to the make and model to determine a deduction and/or conclusion (e.g., if the vehicle is Maker A, Model B, apply rules that are applicable to Maker A, Model B). An age of the vehicle 120 may also be considered. The inference engine 106 may apply and execute rules from the rules 1-N specific to the age to determine a deduction and/or conclusion (e.g., if the vehicle is 10 years old, apply and execute rules that are applicable to vehicles that are 10 years old). Similarly, the inference engine 106 may also consider the age of the battery of the vehicle 120.

A weight and/or load of the vehicle 120 may also be considered. The inference engine 106 may apply and execute rules from the rules 1-N specific to the weight and/or load to determine a deduction and/or conclusion (e.g., if the weight and/or load falls into a certain range, apply and execute rules that are applicable to the range).

A comfort setting and/or HVAC setting of the vehicle 120 may also be considered. The inference engine 106 may apply and execute rules from the rules 1-N specific to the comfort setting and/or HVAC setting to determine a deduction and/or conclusion (e.g., if the comfort setting indicates that air-conditioning will likely operate, apply and execute rules that are applicable to air conditioning).

A software feature of the vehicle 120 may also be considered. The inference engine 106 may apply and execute rules from the rules 1-N specific to the software feature to determine a deduction and/or conclusion (e.g., if autonomous driving is enabled, apply and execute rules that are applicable to autonomous driving).

A charging setting and/or state of charge (e.g., charging or discharging a battery) of the vehicle 120 may also be considered. The inference engine 106 may apply and execute rules from the rules 1-N specific to the charging setting to determine a deduction and/or conclusion (e.g., if fast charging process last charged the vehicle 120, apply and execute rules that are applicable to fast charging).

Sensor data of the vehicle 120 may also be considered. For example, the sensor data may indicate a tire condition, such as the tire pressure being low. The inference engine 106 may apply and execute rules from the rules 1-N rules specific to the sensor data to determine a deduction and/or conclusion (e.g., if tire pressure is low, apply and execute rules that are applicable to low tire pressure). The sensor data may similarly include a humidity and pressure.

Furthermore, the inference engine 106 may select and execute rules based on the navigation data, and in particular a travel route (e.g., first and third characteristics) of the vehicle 120. In this example, the navigation data indicates that the vehicle 120 will travel along a path 114. The path 114 (e.g., travel route) may lead from an origin 110 (e.g., travel data) to a destination 112 (e.g., travel data). The path 114 may include various terrains, such as first flat portion 114a, mountain 114b and second flat portion 114c (e.g., a valley) and wind speeds. The inference engine 106 may determine the depletion mileage amount based on the navigation data (e.g., terrain and wind speeds) and the specific data.

For example, inference engine 106 may select and execute rules based on the specific data and the navigation data to determine the predicted mileage data. In this examples, the inference engine 106 may apply and execute rules from the rules 1-N that are specific to the path 114 (e.g., altitude changes, terrain, curvatures, flat, distance, etc.). For example, the inference engine 106 may select and execute rules that are applicable to characteristics of the path (e.g., select and execute rules that are applicable to altitude increases, and then altitude decreases similar to the altitude changes of mountain 114b). That is, the inference engine 106 may generate the depletion mileage amount based on the navigation data, the battery range knowledge base 104, the specific data, and the facts.

Similarly, the KBAIS 116 may consider other factors and retrieve and/or process rules based on the other factors. Thus, the KBAIS 116 is flexible in nature and may operate in real-time to provide a more accurate mileage range of the vehicle 120. Thus, the KBAIS 116 may identify a selected rule from a plurality of rules of the battery range knowledge base 104 based on one or more of a first characteristic (e.g., terrain) of the travel route of the vehicle 120 or a second characteristic (e.g., make and model) of the vehicle. The selected rule may have several inputs. For example, the inputs may include a third characteristic (e.g., number of miles, weather, etc.) of the travel route or a fourth characteristic (e.g., weight, load, tire pressure, etc.) of the vehicle. Examples may execute the fourth rule to determine the depletion mileage amount based on the third characteristic and the fourth characteristic.

The predicted mileage range may be determined according to Equation 3 based on the depletion mileage amount and is provided to the vehicle 120. In some examples, the depletion mileage amount may be provided instead of and/or in conjunction with the predicted mileage range. The predicted mileage range may be presented to a driver of the vehicle 120 on a graphical user interface (GUI) of a display of the vehicle 120. Of note is that is that the navigation of the vehicle 120 may be adjusted based on the predicted mileage range. For example, the predicted mileage range may be used to determine a location to recharge and/or refuel vehicle 120. Some examples may automatically control the vehicle 120 to drive the electric vehicle to the location if automated driving is enabled.

Some examples may be applicable to a plurality of paths. For example, multiple paths may exist between origin 110 and destination 112. The KBAIS 116 may analyze each of the paths to determine a predicted mileage range for each of the paths. The GUI may display the predicted mileage range of each respective path in association with the respective path (e.g., path A will result in a predicted mileage range of 290 miles, path B will result in a precited mile range of 220 miles, etc.). The driver may then select a path of the paths to navigate and traverse. In some examples, one of the paths corresponding to a greatest predicted mileage range is automatically selected, particularly if autonomous driving is enabled.

Some examples include adjusting, with the inference engine 106, the predicted mileage range based on one or more driving characteristics of the vehicle 120 as the vehicle 120 travels along the path 114 (e.g., a travel route) to generate an adjusted predicted mileage range. The KBAIS 116, vehicle 120 and/or another computing device may determine whether to adjust the travel route based on the adjusted predicted mileage range. For example, the vehicle 120 may provide real-time data indicating conditions (e.g., driving characteristics such as traffic, weather, accidents, etc.) that are sensed by the vehicle 120 to the KBAIS 116. In some examples, the KBAIS 116 may retrieve the real-time data from various sources (e.g., websites, traffic reports, crowd sourced data, etc.). For example, the real-time data may indicate that heavy fog and rain is occurring along the path 114. The inference engine 106 may select a different rule (that was not previously applied to determine the predicted mileage range) from the battery range knowledge base 104 based on the real-time data. In such an example, due to the wipers being actuated, the predicted mileage range may decrease, and the different rule is applied to generate the adjusted predicted mileage range. The adjusted predicted mileage range is provided to the vehicle 120. The travel route may be adjusted (e.g., navigation directions of the vehicle 120 are adjusted) to travel to a recharging and/or refilling station prior to the adjusted predicted mileage range (e.g., battery range) dropping to a predetermined level (e.g., 10 miles) and/or being between certain boundaries (e.g., 10 to 50 miles).

In some examples, the actual mileage to travel along the path 114 is tracked and provided to the KBAIS 116. The KBAIS 116 may adjust and learn based on the actual mileage to adjust the rules 1-N. For example, the KBAIS 116 may determine that the battery range knowledge base 104 (e.g., relevant rules) is to be updated when the actual mileage range deviates from the predicted mileage range by an amount that meets a threshold (e.g. a fit curve deviates from a real curve as discussed below). In some examples, a notification may be provided to an operator when the amount meets the threshold, and the operator may manually adjust the rules 1-N. In some examples, the KBAIS 116 may automatically adjust the rules 1-N by retraining the machine learning model 122 to generate new rules from the battery range knowledge base 104 and increase accuracy when the amount that meets the threshold.

Thus, examples include a system that trains an KBAIS 116 (e.g., an AI model) through knowledge-based learning about road terrain for estimating battery range. For example, the road terrain may be captured using a vehicle camera of vehicle 120. The KBAIS 116 trains using the video to understand the impact of the terrain on the battery range and inform an operator by adapting a rule set. In particular, the KBAIS 116 may use a knowledge-based approach to assist end-users with questions. For instance, in some examples the navigation data may be in the form of a query, such as "Hi vehicle, I'm driving from San Jose to Los Angeles, can you tell me if my battery has sufficient range?" The KBAIS 116 may interpret the query, generate the path 114, determine the predicted mileage range and respond using if the range is sufficient or insufficient by factoring rules of the rules 1-N. For example, if the predicted mileage range is less than the mileage of the path 114, the KBAIS 116 may provide an answer of "no" to the query. If the predicted mileage range is equal to or greater than the mileage of the path 114, the KBAIS 116 may provide an answer of "yes" to the query.

Examples may train the KBAIS 116 to generate an output based on one or more of image data associated with vehicles 102, mileage data of the vehicles 102, rules of battery range knowledge base 104 of the KBAIS 116 or facts of the KBAIS 116, where the image data represents terrains travelled by the vehicles. For example, the KBAIS 116 may represent big data having historical data to train the KBAIS 116 to build inherent knowledge about a road and related battery consumption. In some examples, an operator may interact with the KBAIS 116 to understand the meaning underlying the predicted mileage range (e.g., battery range) estimated by the KBAIS 116 through the rules.

The KBAIS 116 may be a server, computing device, desktop, etc. in some examples. In some examples, the KBAIS 116 and/or vehicle 120 includes logic instructions (e.g., software), a non-transitory computer readable storage medium, circuitry, configurable logic, fixed-functionality hardware logic, etc., or any combination thereof.

Figure 2:
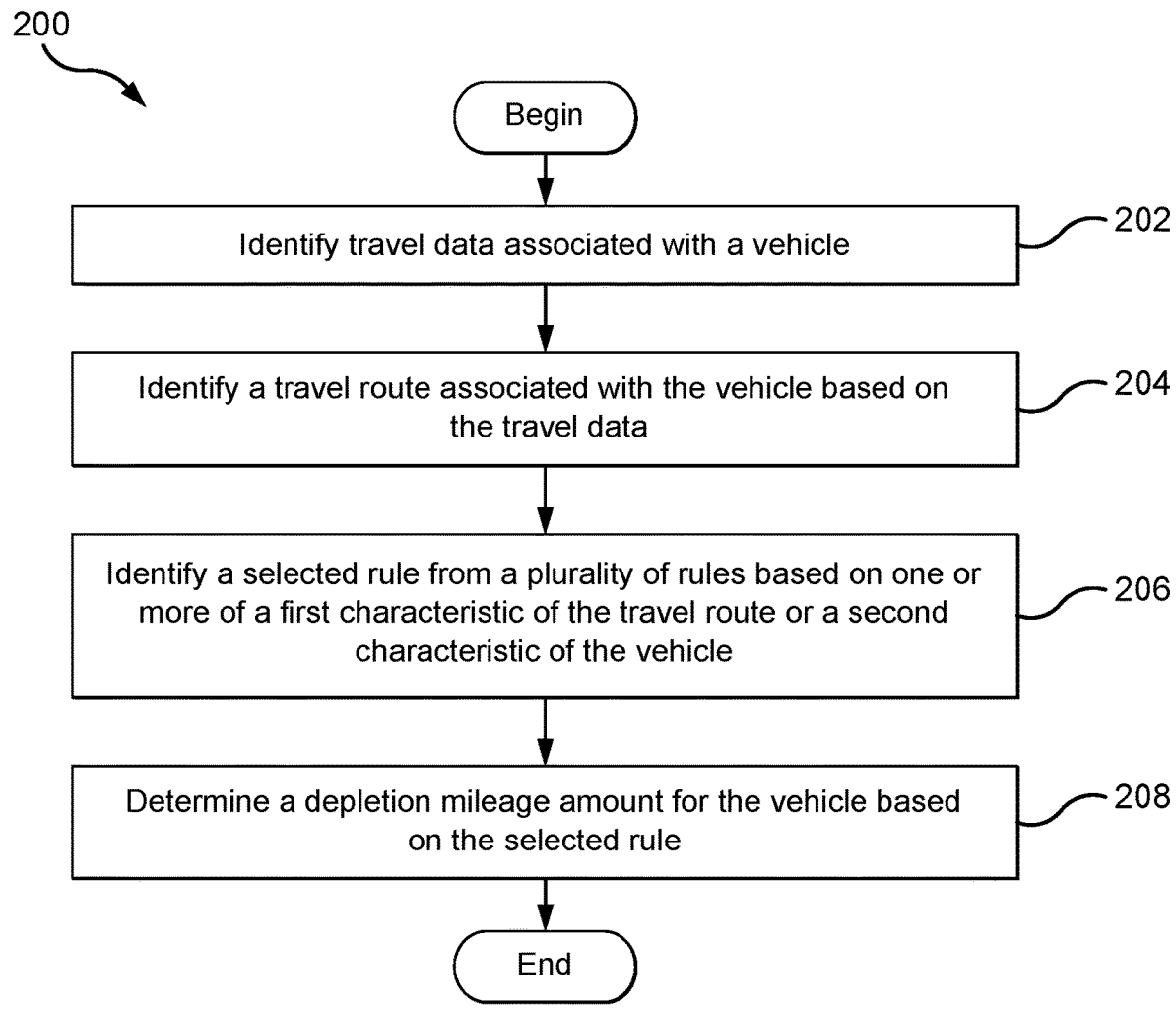
FIG. 2 is a flowchart of a method of predicting a mileage range of a vehicle according to an example.

FIG. 2 shows a method 200 of predicting a mileage range of a vehicle. The method 200 may generally be implemented as part of the mileage range prediction process 100 (FIG. 1). In an embodiment, the method 200 is implemented in logic instructions (e.g., software), a non-transitory computer readable storage medium, circuitry, configurable logic, fixed-functionality hardware logic, etc., or any combination thereof.

Illustrated processing block 202 identifies travel data associated with a vehicle. Illustrated processing block 204 identifies a travel route associated with the vehicle based on the travel data. Illustrated processing block 206 identifies a selected rule from a plurality of rules based on one or more of a first characteristic of the travel route or a second characteristic of the vehicle. Illustrated processing block 208 determines a depletion mileage amount for the vehicle based on the selected rule. In some examples, the method 200 determines a predicted mileage range of the vehicle based on the depletion mileage range, and transmits one or more of the predicted mileage range or the depletion mileage amount to the vehicle.

In some examples, processing block 208 (e.g., determine the depletion mileage amount) includes identifying one or more of a third characteristic of the travel route or a fourth characteristic of the vehicle, and determining the depletion mileage amount based on the one or more of the third characteristic or the fourth characteristic. In some examples, the first characteristic including a terrain of the travel route, and the second characteristic includes one or more of a model of the vehicle, a make of the vehicle, an age of the vehicle, an age of a battery of the vehicle, a weight of the vehicle, a comfort setting of the vehicle, a software feature of the vehicle, a charging setting, sensor data of the vehicle, or a driver profile associated with a driver of the vehicle.

In some examples, method 200 generates, with a machine learning model, the plurality of rules based on vehicle data of a plurality of vehicles. In such examples, the method 200 includes generating a first fit curve based on a first rule of the plurality of rules, generating a real curve based on actual mileage depletion data of the plurality of vehicles, determining a first deviation of the first fit curve from the real curve, and determining whether to adjust the first rule based on the first deviation. In such examples, the method 200 includes adjusting the first rule with the machine learning model to generate an adjusted first rule, generating a second fit curve based on the adjusted first rule, determining a second deviation of the second fit curve from the real curve, and determining whether to adjust the adjusted first rule based on the second deviation.

Figure 3:
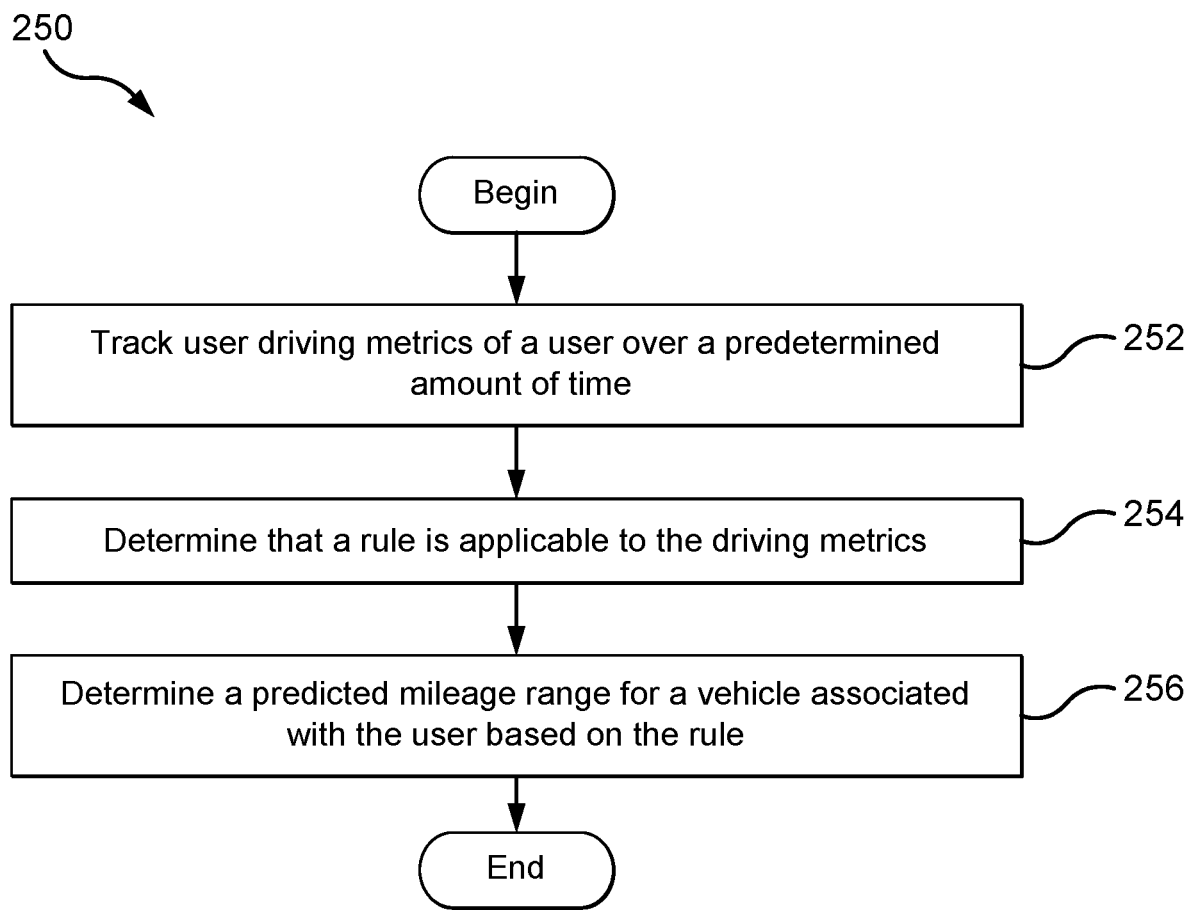
FIG. 3 is a flowchart of a method of determining a mileage range based on user driving metrics and with a KBAIS according to an example.

FIG. 3 shows a method 250 of determining a mileage range based on user driving metrics and with a KBAIS. The method 250 may generally be implemented as part of the mileage range prediction process 100 (FIG. 1) and or method 200 (FIG. 2). In an embodiment, the method 250 is implemented in logic instructions (e.g., software), a non-transitory computer readable storage medium, circuitry, configurable logic, fixed-functionality hardware logic, etc., or any combination thereof.

Illustrated processing block 252 tracks user driving metrics (e.g., acceleration, deceleration, velocity, etc.) of a user over a predetermined amount of time. Illustrated processing block 254 determines (e.g., with an inference engine) that a rule (e.g., a knowledge base) is applicable to the driving metric. Illustrated processing block 256 determines a predicted mileage range for a vehicle associated with the user based on the rule. Thus, method 250 may determine the predicted mileage range based on user specific characteristics.

Figure 4:
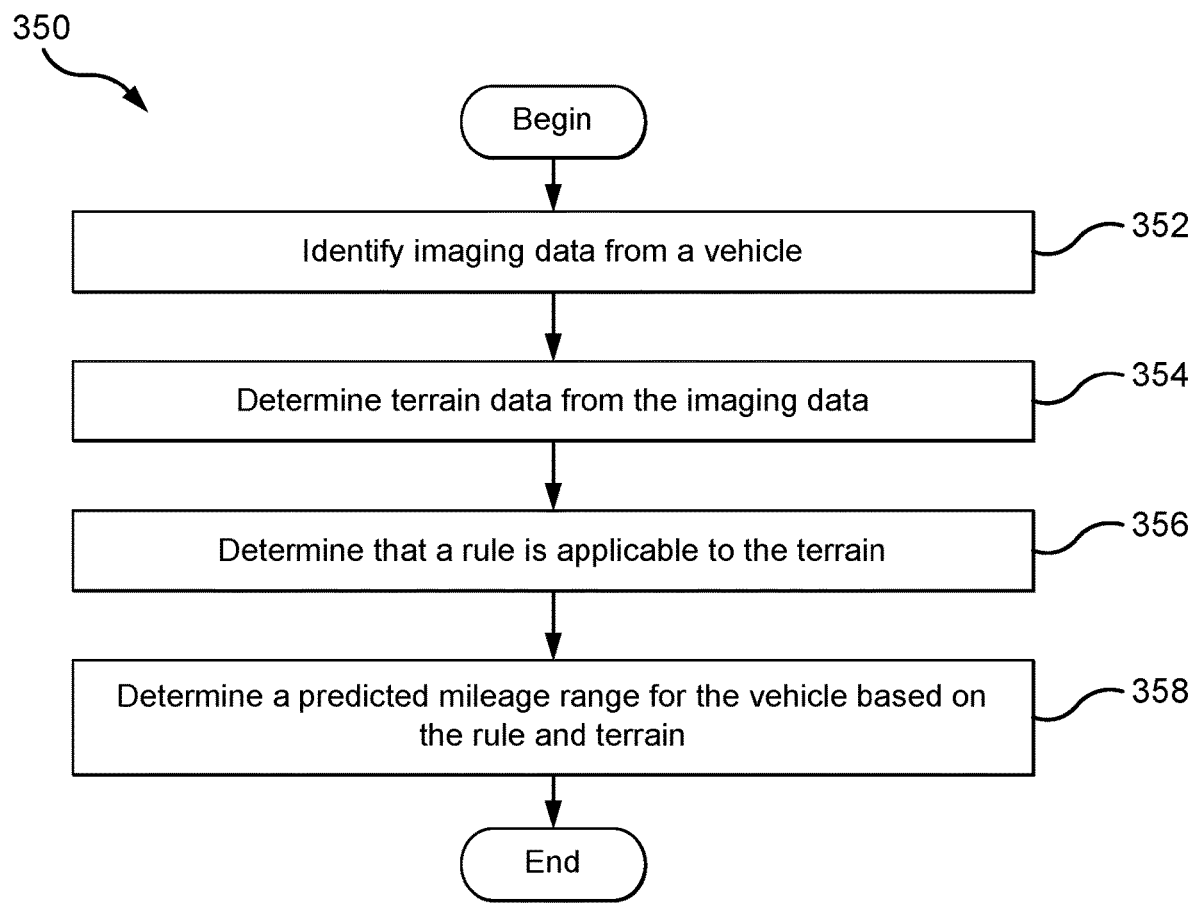
FIG. 4 is a flowchart of a method of determining a mileage range based on imaging data and with a KBAIS according to an example.

FIG. 4 shows a method 350 of determining a mileage range based on imaging data with a KBAIS. The method 350 may generally be implemented as part of the mileage range prediction process 100 (FIG. 1) and or method 200 (FIG. 2). In an embodiment, the method 350 is implemented in logic instructions (e.g., software), a non-transitory computer readable storage medium, circuitry, configurable logic, fixed-functionality hardware logic, etc., or any combination thereof.

Illustrated processing block 352 identifies imaging data from a vehicle. Illustrated processing block 354 determines terrain data from the imaging data (e.g., with a neural network or other machine learning model). Illustrated processing block 356 determines (e.g., with an inference engine) that a rule (e.g., from a knowledge base) is applicable to the terrain. Illustrated processing block 358 determines a predicted mileage range for the vehicle based on the rule and the terrain.

Figure 5:
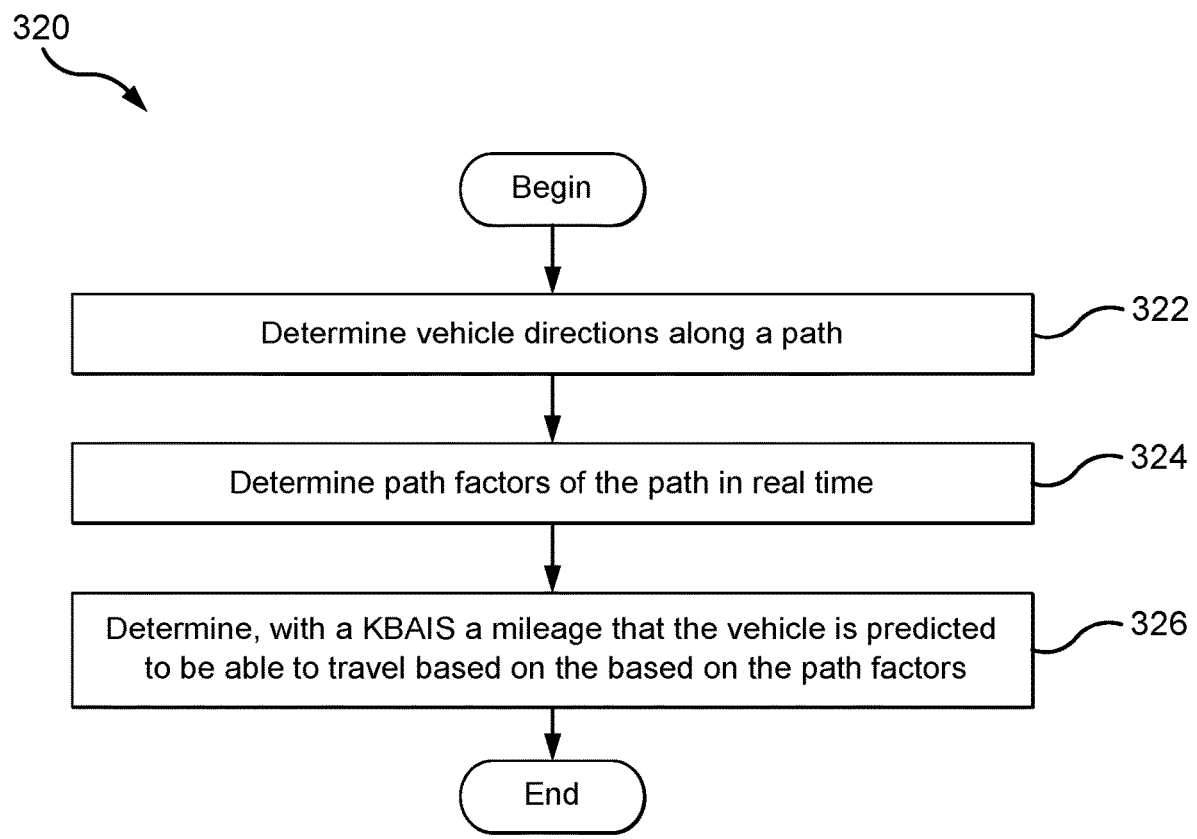
FIG. 5 is a flowchart of a method of determining a mileage range based on path factors and with a KBAIS according to an example.

FIG. 5 shows a method 320 of determining a mileage range based on path factors. The method 320 may generally be implemented as part of the mileage range prediction process 100 (FIG. 1), method 200 (FIG. 2), method 250 (FIG. 3) and/or method 350 (FIG. 4). In an embodiment, the method 320 is implemented in logic instructions (e.g., software), a non-transitory computer readable storage medium, circuitry, configurable logic, fixed-functionality hardware logic, etc., or any combination thereof.

Illustrated processing block 322 determines vehicle directions along a path. Illustrated processing block 324 determines path factors of the path in real time. The path factors may include road characteristics, traffic, curvature, terrain, etc. Illustrated processing 326 determines, with a KBAIS, a mileage that the vehicle is predicted to be able to travel (e.g., predicted mileage range) based on the based on the path factors.

Figure 6A:
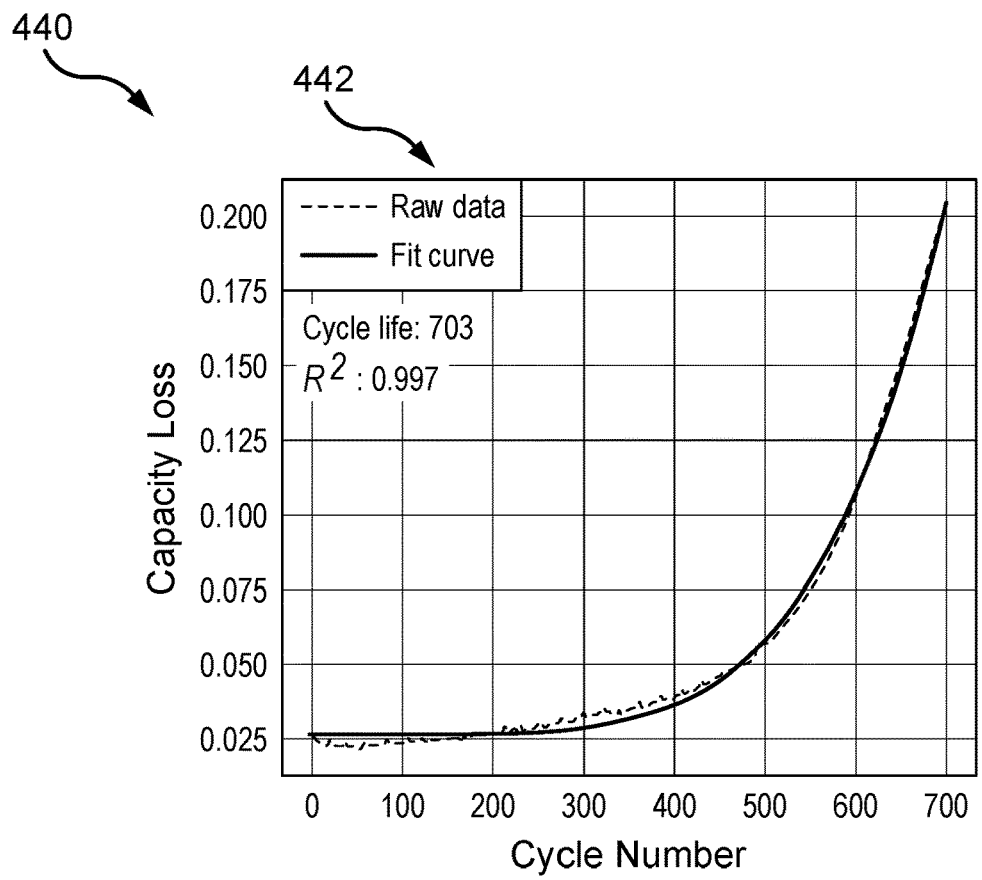
FIGS. 6A, 6B and 6C illustrate fit curves of rules and actual data curves of actual energy depletion of vehicles.
Figure 6B:
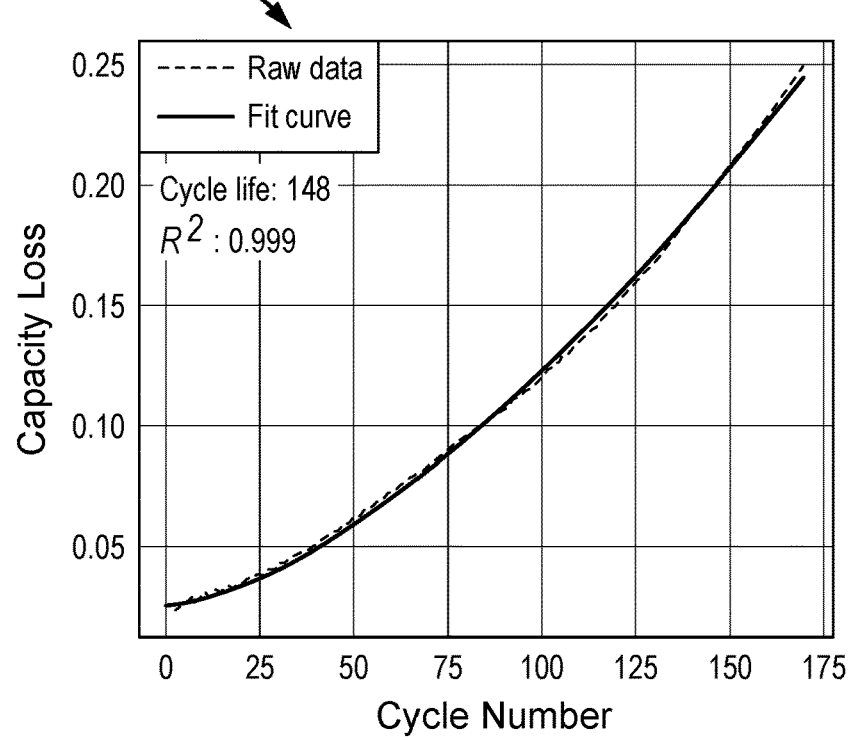
Figure 6C:
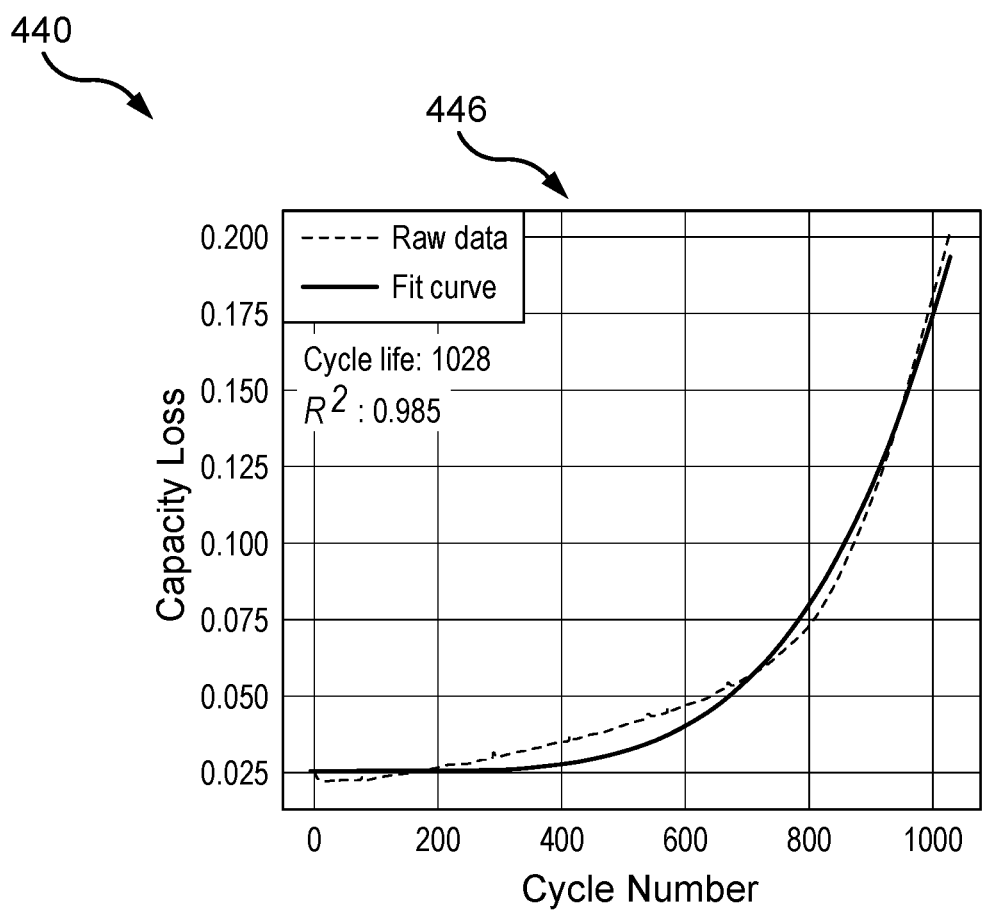

FIGS. 6A-6C illustrate an accuracy measurement process 440. The accuracy measurement process 440 may generally be implemented in mileage range prediction process 100 (FIG. 1), method 200 (FIG. 2), method 250 (FIG. 3), method 350 (FIG. 4) and/or method 320 (FIG. 5).

The accuracy measurement process 440 includes a first graph 442. The accuracy measurement process 440 generates a first fit curve (solid line entitled fit curve) based on a first rule of a plurality of rules that is associated with a vehicle. The first fit curve may be the first rule with a series of different inputs provided to the first rule during different cycles to generate outputs, which is battery capacity loss. The battery capacity loss of each cycle is plotted to the first graph 442. The actual capacity loss of the vehicle is also plotted to the first graph 442 as the raw data (dashed line). Thus, the accuracy measurement process 440 generates a real curve based on actual mileage depletion data of the vehicle. The accuracy measurement process 440 determines a first deviation of the first fit curve from the real curve (e.g., how closely does the first fit curve match the raw curve), and determines whether to adjust the first rule based on the first deviation (e.g., retrain a machine learning model that generated the first rule and output an adjusted first rule to replace the first rule). If so, examples may adjust the first rule with the machine learning model to generate an adjusted first rule, generate a second fit curve based on the adjusted first rule, determine a second deviation of the second fit curve from the real curve and determine whether to adjust the adjusted first rule based on the second deviation. The above readjusting of the first rule and measuring deviation of the first rule from the raw curve may continue until the fit curve closely matches the raw curve (e.g., the deviation is below a threshold).

Similarly, the accuracy measurement process 440 may measure accuracy of and adjust a second rule based on a second graph 444. The second graph 444 maps the outputs of the second rule as the fit curve, and includes real curve of real capacity loss from a vehicle (raw data curve that is the dashed line). Similarly, the accuracy measurement process 440 may measure accuracy of and adjust a third rule based on a third graph 446. The third graph 446 maps the outputs of the third rule as the fit curve, and includes real curve of real capacity loss from a vehicle (raw data curve that is the dashed line).

Figure 7:
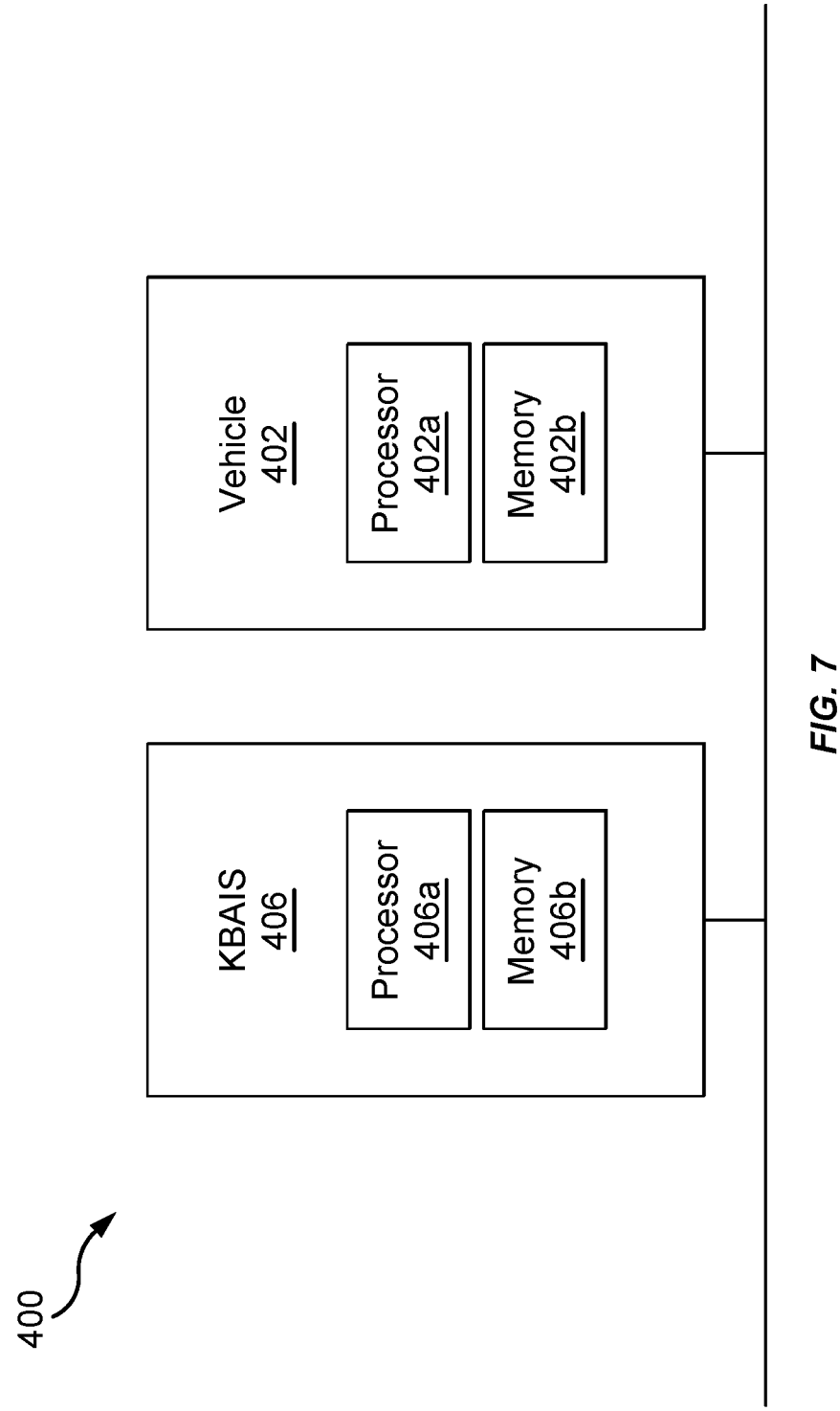
FIG. 7 is a block diagram of an example of an enhanced vehicle architecture according to an embodiment.

FIG. 7 shows a more detailed example of an enhanced vehicle architecture 400 to predict a mileage range and control a vehicle based on the predicted mileage range. The enhanced vehicle architecture 400 may generally be implemented in mileage range prediction process 100 (FIG. 1), method 200 (FIG. 2), method 250 (FIG. 3), method 350 (FIG. 4), method 320 (FIG. 5) and/or accuracy measurement process 440 (FIGS. 6A-6C).

A KBAIS 406 may include a processor 406a (e.g., embedded controller, central processing unit/CPU) and a memory 406b (e.g., non-volatile memory/NVM and/or volatile memory). The memory 406b contains a set of instructions, which when executed by the processor 406a, cause the KBAIS 406 to identify travel data associated with a vehicle 402, identify a travel route associated with the vehicle based on the travel data, and determine, with a knowledge-based artificial intelligence system (KBAIS), a predicted mileage range for the vehicle based on the travel route. The KBAIS 406 may be readily substituted for and/or incorporated into the KBAIS 116 (FIG. 1).

The vehicle 402 may include a processor 402a (e.g., embedded controller, central processing unit/CPU) and a memory 402b (e.g., non-volatile memory/NVM and/or volatile memory). The memory 402b contains a set of instructions, which when executed by the processor 402a, cause the vehicle 402 to receive the predicted mileage range from the KBAIS 406, present a GUI, and display the predicted mileage range to a user on the GUI. The vehicle 402 may also provide data to the KBAIS 406. The KBAIS 406 may be readily incorporated into and/or substitute for the vehicle 120 (FIG. 1).

Figure 8:
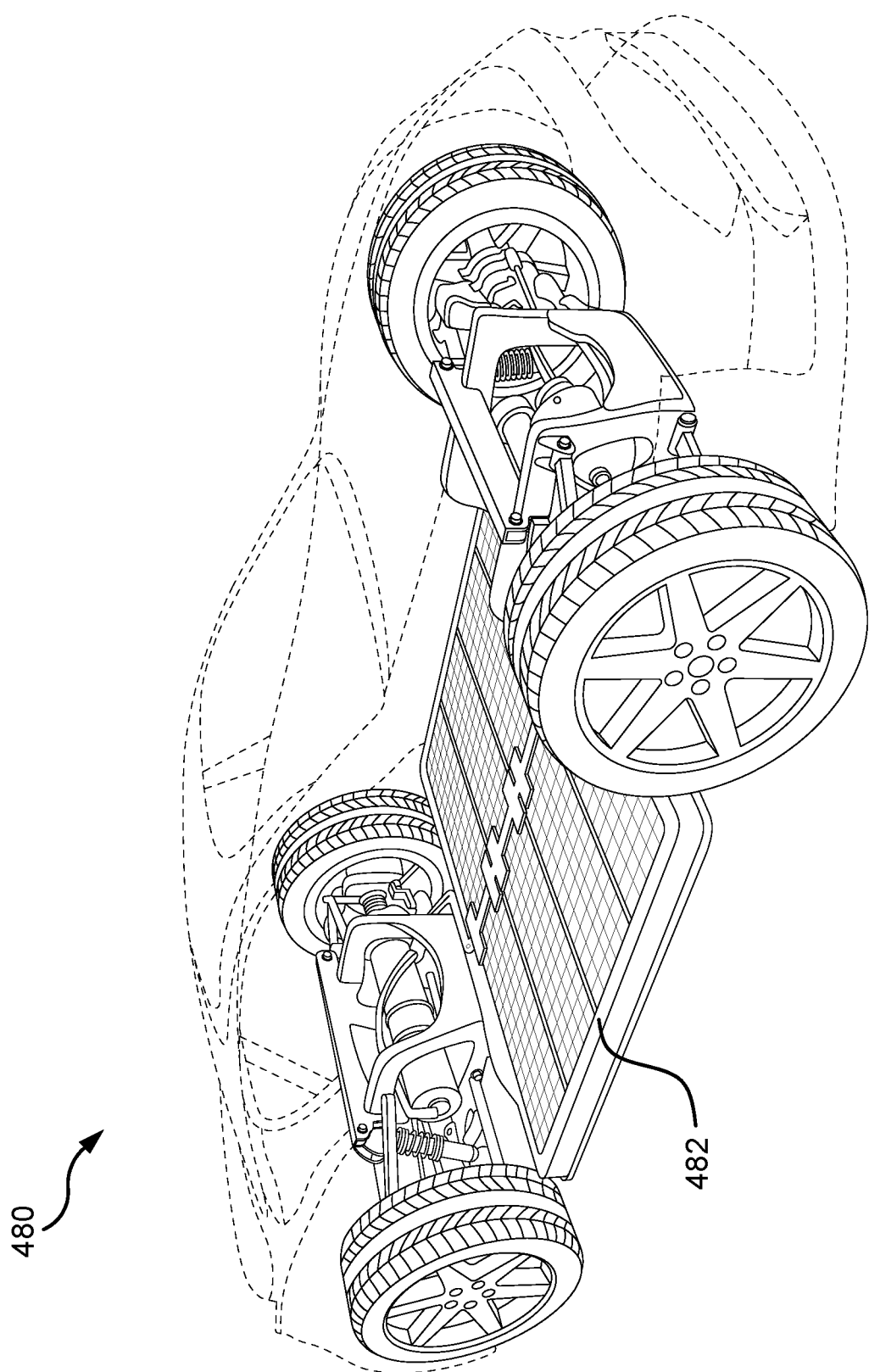
FIG. 8 is a diagram of an example of an electric vehicle according to an embodiment.

FIG. 8 illustrates an electric vehicle 480. The vehicle 480 may generally be implemented in mileage range prediction process 100 (FIG. 1), method 200 (FIG. 2), method 250 (FIG. 3), method 350 (FIG. 4), method 320 (FIG. 5), accuracy measurement process 440 (FIGS. 6A-6C) and/or enhanced vehicle architecture 400 (FIG. 7). The electric vehicle 480 includes a battery 482 that stores energy. As the electric vehicle 480 travels, the battery charge of the battery may be reduced impacting mileage range of the electric vehicle 480.

Figure 9:
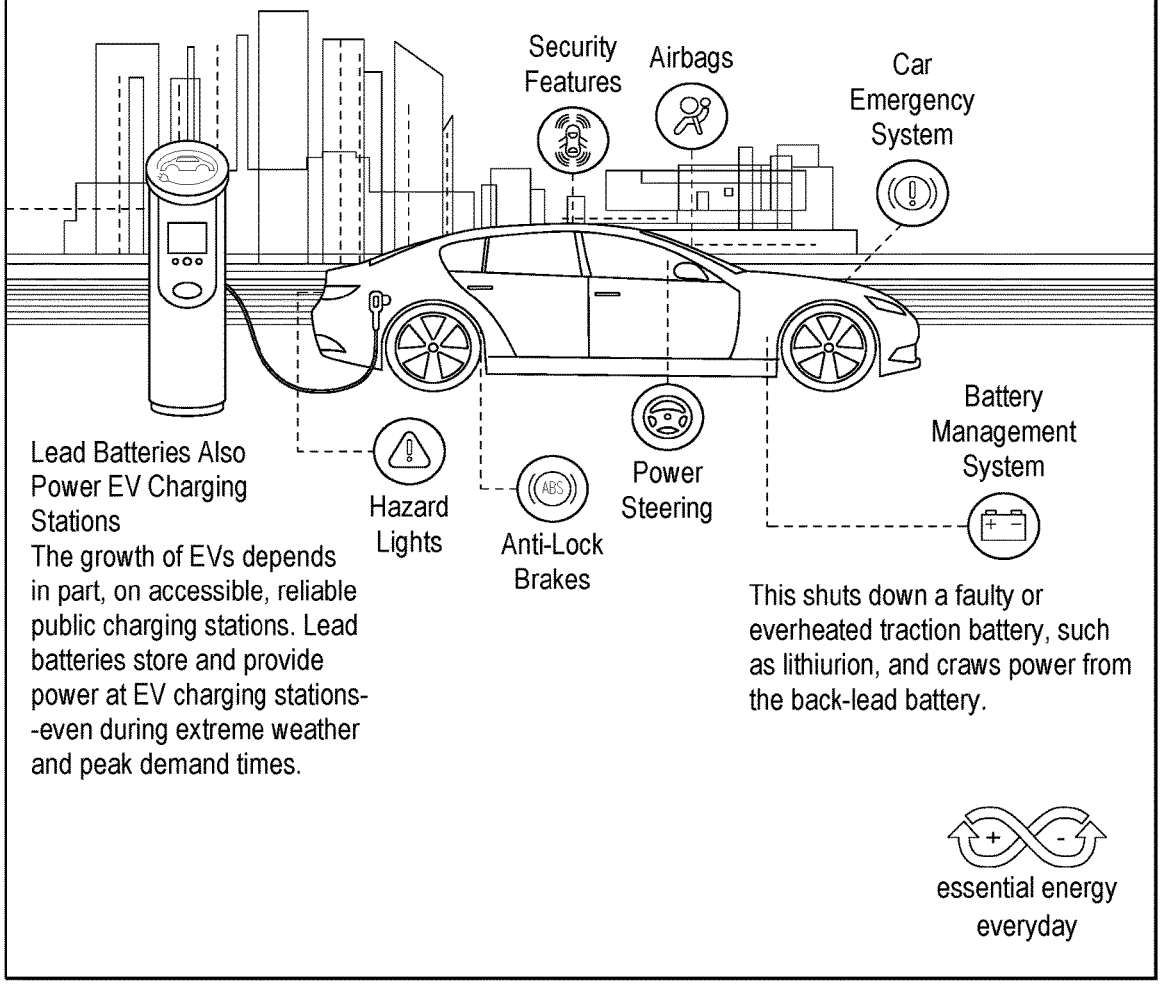
FIG. 9 is a diagram of an example of charging an electric vehicle according to an embodiment.

FIG. 9 illustrates a charging an electric vehicle 490. The electric vehicle 490 may generally be implemented in mileage range prediction process 100 (FIG. 1), method 200 (FIG. 2), method 250 (FIG. 3), method 350 (FIG. 4), method 320 (FIG. 5), accuracy measurement process 440 (FIGS. 6A-6C), enhanced vehicle architecture 400 (FIG. 7) and/or electric vehicle 480 (FIG. 8). Different systems of the 490 are further illustrated that may impact mileage range of the electric vehicle 490.

The above-described methods and systems may be readily combined together if desired. The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein to facilitate discussion, and carry no particular temporal or chronological significance unless otherwise indicated.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

What is claimed is:

1. A computing system comprising:
at least one processor; and
at least one memory having instructions, which when executed by the at least one processor, causes the computing system to:
generate, with a machine learning model, a plurality of rules based on characteristics of a plurality of vehicles and travel route characteristics of different travel routes with varying terrain, wherein the plurality of rules model mileage behavior of the vehicles;
identify travel data associated with a current vehicle;
identify a current travel route associated with the current vehicle based on the travel data;
select a rule from the plurality of rules based on a first characteristic of the current travel route and a second characteristic of the current vehicle, wherein the first characteristic includes a terrain of the current travel route, and the second characteristic includes a setting of the current vehicle; and
determine a depletion mileage amount for the current vehicle based on the selected rule.

2. The computing system of claim 1, wherein the instructions, when executed, cause the computing system to:
determine a predicted mileage range of the current vehicle based on the depletion mileage amount; and
transmit one or more of the predicted mileage range or the depletion mileage amount to the current vehicle.

3. The computing system of claim 1, wherein to determine the depletion mileage amount, the instructions, when executed, cause the computing system to:
identify one or more of a third characteristic of the current travel route or a fourth characteristic of the current vehicle; and
determine the depletion mileage amount based on the one or more of the third characteristic or the fourth characteristic.

4. The computing system of claim 1, wherein the instructions, when executed, cause the computing system to:

generate a first fit curve based on a first rule of the plurality of rules;
generate a real curve based on actual mileage depletion data of the plurality of vehicles;
determine a first deviation of the first fit curve from the real curve; and
determine whether to adjust the first rule based on the first deviation.

5. The computing system of claim 4, wherein the instructions, when executed, cause the computing system to:
adjust the first rule with the machine learning model to generate an adjusted first rule;
generate a second fit curve based on the adjusted first rule;
determine a second deviation of the second fit curve from the real curve; and
determine whether to adjust the adjusted first rule based on the second deviation.

6. The computing system of claim 1, wherein:
the second characteristic further includes one or more of a model of the current vehicle, a make of the current vehicle, an age of the current vehicle, an age of a battery of the current vehicle, a weight of the current vehicle, a comfort setting of the current vehicle, a software feature of the current vehicle, a charging setting, sensor data of the current vehicle, or a driver profile associated with a driver of the current vehicle.

7. At least one computer readable storage medium comprising a set of instructions, which when executed by a computing device, cause the computing device to:
generate, with a machine learning model, a plurality of rules based on characteristics of a plurality of vehicles and travel route characteristics of different travel routes with varying terrain, wherein the plurality of rules model mileage behavior of the vehicles;
identify travel data associated with a current vehicle;
identify a current travel route associated with the current vehicle based on the travel data;
select a rule from the plurality of rules based on one or more of a first characteristic of the current travel route and a second characteristic of the current vehicle, wherein the first characteristic includes a terrain of the current travel route, and the second characteristic includes a setting of the current vehicle; and
determine a depletion mileage amount for the current vehicle based on the selected rule.

8. The at least one computer readable storage medium of claim 7, wherein the instructions, when executed, cause the computing device to:
determine a predicted mileage range of the current vehicle based on the depletion mileage amount; and
transmit one or more of the predicted mileage range or the depletion mileage amount to the current vehicle.

9. The at least one computer readable storage medium of claim 7, wherein the instructions, when executed, cause the computing device to:
identify one or more of a third characteristic of the current travel route or a fourth characteristic of the current vehicle; and
determine the depletion mileage amount based on the one or more of the third characteristic or the fourth characteristic.

10. The at least one computer readable storage medium of claim 7, wherein the instructions, when executed, cause the computing device to:
generate a first fit curve based on a first rule of the plurality of rules;
generate a real curve based on actual mileage depletion data of the plurality of vehicles;
determine a first deviation of the first fit curve from the real curve; and
determine whether to adjust the first rule based on the first deviation.

11. The at least one computer readable storage medium of claim 10, wherein the instructions, when executed, cause the computing device to:
adjust the first rule with the machine learning model to generate an adjusted first rule;
generate a second fit curve based on the adjusted first rule;
determine a second deviation of the second fit curve from the real curve; and
determine whether to adjust the adjusted first rule based on the second deviation.

12. The at least one computer readable storage medium of claim 7, wherein the instructions, when executed, cause the computing device to:
the second characteristic further includes one or more of a model of the current vehicle, a make of the current vehicle, an age of the current vehicle, an age of a battery of the current vehicle, a weight of the current vehicle, a comfort setting of the current vehicle, a software feature of the current vehicle, a charging setting, sensor data of the current vehicle, or a driver profile associated with a driver of the current vehicle.

13. A method comprising:
generating, with a machine learning model, a plurality of rules based on characteristics of a plurality of vehicles and travel route characteristics of different travel routes with varying terrain, wherein the plurality of rules model mileage behavior of the vehicles;
identifying travel data associated with a current vehicle;
identifying a current travel route associated with the current vehicle based on the travel data;
selecting a rule from the plurality of rules based on a first characteristic of the current travel route or a second characteristic of the current vehicle, wherein the first characteristic includes a terrain of the current travel route, and the second characteristic includes a setting of the current vehicle; and
determining a depletion mileage amount for the current vehicle based on the selected rule.

14. The method of claim 13, further comprising:
determining a predicted mileage range of the current vehicle based on the depletion mileage amount; and
transmitting one or more of the predicted mileage range or the depletion mileage amount to the current vehicle.

15. The method of claim 13, further comprising:
identifying one or more of a third characteristic of the current travel route or a fourth characteristic of the current vehicle; and
determining the depletion mileage amount based on the one or more of the third characteristic or the fourth characteristic.

16. The method of claim 13, further comprising:
generating a first fit curve based on a first rule of the plurality of rules;
generating a real curve based on actual mileage depletion data of the plurality of vehicles;
determining a first deviation of the first fit curve from the real curve; and
determining whether to adjust the first rule based on the first deviation.

17. The method of claim 16, further comprising:
adjusting the first rule with the machine learning model to generate an adjusted first rule;
generating a second fit curve based on the adjusted first rule;
determining a second deviation of the second fit curve from the real curve; and
determining whether to adjust the adjusted first rule based on the second deviation,
further wherein the second characteristic further includes one or more of a model of the current vehicle, a make of the current vehicle, an age of the current vehicle, an age of a battery of the current vehicle, a weight of the current vehicle, a comfort setting of the current vehicle, a software feature of the current vehicle, a charging setting, sensor data of the current vehicle, or a driver profile associated with a driver of the current vehicle.

\* \* \* \* \*